United States Patent Office 3,398,193
Patented Aug. 20, 1968

3,398,193
4-DIALKYLAMINO-4'-SECONDARY ALKYL AMINO-DIPHENYLAMINES
Edward L. Wheeler, Woodbury, Conn., assignor to Uniroyal, Inc., a corporation of New Jersey
No Drawing. Filed Sept. 25, 1963, Ser. No. 311,324
The portion of the term of the patent subsequent to Aug. 9, 1983, has been disclaimed and dedicated to the Public
1 Claim. (Cl. 260—576)

ABSTRACT OF THE DISCLOSURE 4-disubstituted amino-4'-monosubstituted amino diphenyl amines are useful as antioxidants when used in combination with vulcanized rubber.

---

This invention relates to new chemicals which are antiozonants for rubber and to their use in inhibiting the deteriorating effect of ozone on rubber.

It is known that ozone causes surface cracking of conventional rubber vulcanizates when the rubber is under strain. The most severe deterioration occurs when a small number of cracks are formed which grow rapidly at the expense of the formation of new cracks. Such a condition will produce deep, disruptive fissures which seriously shorten the serviceable life of the article. Waxes have been utilized to inhibit ozone cracking in articles under static stress by milling them into the rubber stock before vulcanization; the wax migrates to the surface of the rubber article to form a film which acts as a physical barrier to ozone attack. However, if the article is subjected to dynamic flexing during service the wax film breaks and the article cracks worse than if no wax had been incorporated.

Chemical antiozonants have been developed which retard the formation of ozone cracks during both static and dynamic conditions. Examples of antiozonants now being used are N-isopropyl-N'-phenyl-p-phenylenediamine, N-cyclohexyl-N'-phenyl-p-phenylenediamine, N,N'-dioctyl - p - phenylenediamine, 6 - ethoxy - 1,2 - dihydro-2,2,4-trimethyl-quinoline and nickel dibutyldithiocarbamate.

I have discovered a new class of organic compounds which are antiozonants for rubber. The compounds have the general formula:

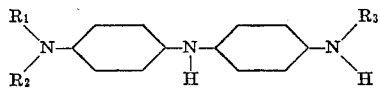

in which $R_1$ and $R_2$ are selected from the group consisting of alkyl radicals having 1 to 8 carbon atoms and cycloalkyl radicals having 5 to 8 carbon atoms, and $R_3$ is selected from the group consisting of secondary alkyl radicals having 3 to 8 carbon atoms and cycloalkyl radicals having 5 to 8 carbon atoms. The chemicals of the present invention are also antioxidants for rubber. The chemicals of the present invention are used as antiozonants and antioxidants for rubber in amounts from 0.1 to 5 parts by weight per 100 parts of rubber.

The chemicals of the above general formula are prepared by reductively alkylating the selected 4-disubstituted amino-4'-nitrodiphenylamine or 4-disubstituted amino-4'-aminodiphenylamine of the formula

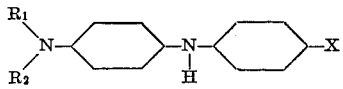

where $R_1$ and $R_2$ are the same as in the above general formula and X is nitro or amino, with the selected ketone in the presence of hydrogen and a suitable hydrogenation catalyst such as palladium-on-charcoal. The 4-disubstituted amino-4'-nitrodiphenylamines are prepared by condensing the selected N,N-dihydrocarbyl-N'-formyl-p-phenylenediamine in which the hydrocarbyl radicals are $R_1$ and $R_2$ in the above general formula with p-nitrochlorobenzene. The 4-disubstituted amino-4'-aminodiphenylamines are prepared by hydrogenating the 4-disubstituted amino-4'-nitrodiphenylamines in the presence of a suitable catalyst such as nickel, copper chromite, platinum, rhodium or palladium. The N,N-dihydrocarbyl-N'-formyl-p-phenylenediamines are prepared by reacting the corresponding N,N-dihydrocarbyl-p-phenylenediamine with formamide.

Examples of the chemicals of the present invention are:

4-dimethylamino-4'-isopropylaminodiphenylamine
4-dimethylamino-4'-cyclohexylaminodiphenylamine
4-dimethylamino-4'-(1,3-dimethylbutylamino) diphenylamine
4-dimethylamino-4'-(2-octylamino)diphenylamine
4-diethylamino-4'-isopropylaminodiphenylamine
4-diethylamino-4'-(2-octylamino)diphenylamine
4-di-n-butylamino-4'-isopropylaminodiphenylamine
4-diisopropylamino-4'-(sec-butylamino)diphenylamine
4-di-sec-butylamino-4'-cyclopentylaminodiphenylamine
4-(N-cyclohexyl-N-methylamino)-4'-(2-amylamino) diphenylamine
4-dicyclohexylamino-4'-isopropylaminodiphenylamine
4-(N-isopropyl-N-methylamino)-4'-(sec-butylamino) diphenylamine Examples 1 to 7 illustrate the preparation of the chemicals of the present invention.

Example 1.—4 - dimethylamino - 4' - isopropylaminodiphenylamine

Into a 1.7 liter rocking autoclave were charged 100 g. of 4-dimethylamino-4'-nitrodiphenylamine, 500 ml. of acetone, and 3.0 g. of 5% palladium-on-carbon. The contents, while agitated, were subjected to 300–500 p.s.i. gauge pressure of hydrogen at 130–135° for 2½ hours. The catalyst war removed by filtration, and the solvent was removed by distillation. Distillation of the product gave 76 g. (72.5% yield) of 4-dimethylamino-4'-isopropylaminodiphenylamine; B.P. 190–200° C. (0.6 mm.).

*Analysis.*—Calculated for $C_{17}H_{23}N_3$: C, 75.7; H, 8.61; N, 15.6. Found: C, 75.8; H, 8.60; N, 15.6.

The 4-dimethylamino-4-nitrodiphenylamine was prepared as follows: A mixture of 295 g. of N,N-dimethyl-N'-formyl-p-phenylenediamine (Beil. XIII, 94), 236 g. of p-nitrochlorobenzene, 150 g. of anhydrous potassium carbonate, and 150 ml. of dimethylformamide was heated at 160–170° C. for 5½ hours with continuous removal of the water formed in the reaction. The reaction mixture was cooled, poured into water, and the resulting precipitate was filtered, washed successively with dilute hydrochloric acid, ethanol, and finally with a mixture of hot benzene and hexane. 222 g. of 4-dimethylamino-4'-nitrodiphenylamine was obtained; M.P. 145–150° C. Recrystallization of the product from nitromethane yielded material with a melting point of 151.0–152.5° C.

*Analysis.*—Calculated for $C_{14}H_{15}N_3O_2$: C, 65.4; H, 5.88; N, 16.3. Found: C, 65.3; H, 6.08; N, 16.2.

Example 2.—4 - dimethylamino - 4' - cyclohexylaminodiphenylamine

A mixture of 90 g. of 4-dimethylamino-4'-nitrodiphenylamine, prepared as in Example 1, 410 ml. of cyclohexanone, and 5.0 g. of 5% palladium-on-carbon was hydrogenated at 80° C. for 4½ hours under 300–500 p.s.i. gauge pressure of hydrogen. A quantitative yield of crude 4 - dimethylamino-4'-cyclohexylaminodiphenylamine was obtained. Recrystallization of this solid from a benzenehexane mixture gave material melting at 102.5–103.5° C.

*Analysis.*—Calculated for $C_{20}H_{27}N_3$: C, 77.6; H, 8.79; N, 13.6. Found: C, 77.8; H, 8.92; N, 13.7.

Example 3.—4 - dimethylamino - 4' - (1,3-dimethylbutylamino)-diphenylamine

A mixture of 90 g. of 4-dimethylamino-4'-nitrodiphenylamine, prepared as in Example 1, 500 ml. of methyl isobutyl ketone, and 6.0 g. of 5% palladium-on-carbon was hydrogenated under 300–500 p.s.i. gauge pressure of hydrogen for 4¼ hours at 85° C. and 4½ hours at 100° C. The catalyst was removed by filtration, and the residue was fractionally distilled. 75.5 g. (67% yield) of 4-dimethylamino-4'-(1,3-dimethylbutylamino)diphenylamine was obtained; B.P. 210–230° C. (0.01 mm.).

*Analysis.*—Calculated for $C_{20}H_{29}N_3$: C, 77.1; H, 9.38; N, 13.5. Found: C, 76.8; H, 9.36; N, 14.0.

Example 4.—4 - dimethylamino - 4' - (2 - octylamino)diphenylamine

A mixture of 90 g. of 4-dimethylamino-4'-nitrodiphenylamine, prepared as in Example 1, 500 ml. of 2-octanone, and 6.0 g. of 5% palladium-on- carbon was hydrogenated under 300–500 p.s.i. gauge pressure of hydrogen for 3½ hours at 80–85° C. and 2¾ hours at 100° C. The catalyst was removed by filtration and the excess 2-octanone by distillation under vacuum. The residue product was 101 g. (93% yield) of 4-dimethylamino-4'-(2-octylamino)diphenylamine. An aliquot of this residue was fractionally distilled; B.P. 221–230° C. (0.05 mm.).

*Analysis.*—Caclulated for $C_{22}H_{33}N_3$: C, 77.8; H, 9.80; N, 12.4. Found: C, 77.8; H, 9.55; N, 13.0.

Example 5.—4 - diethylamino - 4' - isopropylaminodiphenylamine

A mixture of 100 g. of 4-diethylamino-4'-nitrodiphenylamine, 200 ml. of acetone, and 3.0 g. of 5% palladium-on-carbon was hydrogenated for 2 hours at 80° C. under 300–500 p.s.i. gauge pressure of hydrogen. The catalyst was removed by filtration, and the solvent was removed by distillation. The residue was fractionally distilled to obtain 76 g. (74% yield) of 4-diethylamino-4'-isopropylaminodiphenylamine; B.P. 196–202° C. (0.4 mm.).

*Analysis.*—Calculated for $C_{19}H_{27}N_3$: C, 76.7; H, 9.15; N, 14.1. Found: C, 77.0; H, 9.17; N, 14.1.

The starting N,N-diethylamino-N'-formyl-p-phenylenediamine was prepared as follows: A mixture of 500 g. of N,N-diethyl-p-phenylenediamine (Beil. XIII, 75) and 270 g. of formamide was heated at 125–135° C. for 2½ hours, then the temperature was allowed to rise to 180° C. and held there for 1½ hours. The excess formamide was then removed by distillation under vacuum. The residue product was N,N-diethylamino-N'-formyl-p-phenylenediamine.

*Analysis.*—Calculated for $C_{11}H_{16}N_2O$: N, 14.6. Found: N, 14.7.

The intermediate 4-diethylamino - 4' - nitrodiphenylamine was prepared as follows: A mixture of 347 g. of N,N-diethyl-N'-formyl-p-phenylendiamine, 236 g. of p-nitrochlorobenzene, 150 g. of anhydrous potassium carbonate, 150 ml. of dimethylformanide, and 10 ml. of benzene was heated at 165–170° C. for 6 hours with continuous removal of the water formed in the reaction. The reaction mixture was then cooled to 100° C., poured into 4 liters of water, and the resulting precipitate was filtered and digested with hexane containing a small amount of benzene. The product was then filtered and recrystallized twice from ethanol to obtain 198 g. (46% yield) of 4-diethylamino - 4' - nitrodiphenylamine; M.P. 141–143° C. A further recrystallization raised the melting point to 142.3–143.5° C.

*Analysis.*—Calculated for $C_{16}H_{19}N_3O_2$: C, 67.9; H, 6.60; N, 1.5. Found: C, 67.6; H, 6.74; N, 14.4.

Example 6.—4 - diethylamino - 4' - (2-octylamino)diphenylamine

A mixture of 96 g. of 4-diethylamino-4'-nitrodiphenylamine, prepared as in Example 5, 200 ml. of 2-octanone, and 3.0 g. of 5% palladium-on-carbon was hydrogenated for 4¾ hours at 100° C. under 300–500 p.s.i. gauge pressure of hydrogen. The catalyst was removed by filtration and the residue was fractionally distilled to obtain 80.5 g. (66% yield) of 4-diethylamino-4'-(2-octylamino)diphenylamine; B.P. 222–234° C. (0.5 mm.).

*Analysis.*—Calculated for $C_{24}H_{37}N_3$: C, 78.4; H, 10.2; N, 11.4. Found: C, 78.3; H, 10.5; N, 11.7.

Example 7.—4-di-n-butylamino-4'-isopropylaminodiphenylamine

A mixture of 34 g. of 4 - di - n - butylamino - 4'-aminodiphenylamine, 160 ml. of acetone, and 2.0 g. of 5% palladium-on-carbon was hydrogenated for ½ hour at 20–70° C. under 400 p.s.i. gauge pressure of hydrogen. The catalyst was removed by filtration, and the residue was fractionally distilled. 32 g. (91% yield) of 4-di-n-butylamino - 4' - isopropylaminodiphenylamine was obtained; B.P. 214–216° C. (0.3 mm.).

*Analysis.*—Calculated for $C_{23}H_{35}N_3$: C, 78.1; H, 9.98; N, 11.9. Found: C, 77.8; H, 10.24; N, 12.0.

The 4 - di - n - butylamino - 4' - aminodiphenylamine was prepared from the 4 - di - n - butylamino - 4' - nitrodiphenylamine which was prepared from the N,N-di-n-butyl - N' - formyl - p - phenylenediamine which was prepared from N,N - di - n - butyl - p - phenylenediamine in the following manner.

A mixture of 122 g. of N,N - di - n - butyl - p - phenylenediamine (Beil. XIII, first supplement, p. 23) and 50 g. of formamide was heated for 3½ hours. The temperature rose from 140° C. to 200° C. during this time. The unreacted formamide was removed by distillation under pressure. The residue product was N,N-di-n-butyl-N'-formyl-p-phenylenediamine.

A mixture of 139 g. of N,N-di-n-butyl-N'-formyl-p-phenylenediamine, 79 g. of p-nitrochlorobenzene, 50 ml. of dimethylformamide, 50 g. of anhydrous potassium carbonate, and 20 ml. of benzene was heated at 160–170° C. for 5 hours with continuous removal of the water formed during the reaction. The mixture was cooled to 100° C. and poured into 1 liter of water. The insoluble brown oil was separated and steam-stripped to recover 12 g. of unreacted p-nitrochlorobenzene. The residue, 4-di-n-butylamino-4'-nitrodiphenylamine, was taken up in benzene and washed with water and dilute acetic acid. The benzene was removed by distillation.

A mixture of this 4 - di - n - butylamino - 4' - nitrodiphenlamine residue, 750 ml. isopropanol, and 5 g. of 5% palladium-on-carbon was hydrogenated at 40° C. under 300–500 p.s.i. gauge pressure of hydrogen for 5 hours. The catalyst was filtered, and the solvent removed by distillation. The residue was fractionally distilled. 34 g. (26% yield) of 4 - di - n - butylamino - 4' - aminodiphenylamine was obtained; B.P. 226–238° C. (0.8 mm.).

*Analysis.*—Calculated for $C_{20}H_{29}N_3$: C, 77.1; H, 9.38; N, 13.5. Found: C, 77.2; H, 9.29; N, 13.4.

The chemicals of the present invention are anti-ozonants for rubbers, such as natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes-1,3, e.g. butadiene-1,3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a $CH_2=C<$ group where at least one of the disconnected valences is attached to an electronegative group, that is a group which substantially increases the electrical dissymmetry or polar character of the molecule. Examples of such monoethylenic compounds which are copolymerizable with butadienes 1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2-methyl-5-vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4-polybutadiene or a 1,4-polyisoprene, prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with, if desired, a minor proportion of a nonconjugated diene, such as 1,4-hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4-hexadiene.

The new antiozonants may be used in combination with waxes and other antiozonants. They may be used in rubber stocks with the usual compounding ingredients, e.g., vulcanizing agents, accelerators, activators, retarders, antioxidants, softeners, and reinforcing agents.

Examples 8 to 10 illustrate the effectiveness of the chemicals of the present invention as antiozonants and antioxidants for rubber.

Example 8

The ability of the chemicals of the present invention to retard the formation of ozone cracks in cured rubber was determined in the following recipe for the rubber stocks.

| | Parts by weight |
|---|---|
| SBR 1500 (copolymer of about 77 parts by weight of butadiene and 23 parts by weight of styrene) | 100.0 |
| Zinc oxide | 3.0 |
| HAF carbon black | 40.0 |
| EPC carbon black | 10.0 |
| Stearic acid | 1.5 |
| Saturated polymerized petroleum hydrocarbon plasticizer (Para-Flux 2016) | 3.5 |
| Naphthenic type oil (Circo Light Process Aid) | 3.5 |
| N-cyclohexyl-2-benzothiazolesulfenamide | 1.25 |
| Sulfur | 2.0 |
| Antiozone test chemical | 2.0 |

Looped test specimens of the stocks cured for 45 minutes at 292° F. were prepared according to Procedure B (Exposure of Looped Specimens) of ASTM Method D518–57T (Resistance to Surface Cracking of Stretched Rubber Compounds). Specimens were subjected to outdoor exposure on a roof at an angle of 45 degrees facing south. The specimens were observed after appropriate intervals on the roof, and the time recorded to the appearance of cracks corresponding to those having a rating number of 3 in ASTM Method D1171–59 (Test for Weather Resistance Exposure of Automotive Rubber Compounds). The days required to crack to a rating number of 3 are given in the following table:

| Chemical: | Days |
|---|---|
| None | 5–6 |
| 4-dimethylamino-4'-isopropylaminodiphenylamine | 105 |
| 4 - dimethylamino - 4' - (1,3-dimethylbutylamino)-diphenylamine | 227 |
| 4-dimethylamino-4'-(2-octylamino)-diphenylamine | 180 |
| 4 - diethylamino - 4'-isopropylaminodiphenylamine | 229 |
| 4 - diethylamino-4'-(2-octylamino)-diphenylamine | >258 |
| 4-di-n-butylamino-4'-isopropylaminodiphenylamine | >258 |

Example 9

In a dynamic flexing test, molded stocks of the recipe of Example 8, ½" x 6" x ¼" have a ⅛" radius circular groove across the center were cured for 45 minutes at 292° F. They were mounted outdoors facing south and flexed through a 78 degree angle at about 8.5 kilocycles per hour. Observations were made after appropriate intervals and the number of kilocycles recorded to the appearance of cracks corresponding to those having a rating number of 3 in ASTM Method D1171–59. Both unaged stocks and stocks which had been heat aged at 158° F. for 7 days were tested. The number of kilocycles required to crack to a rating number of 3 are given in the following table.

| Chemical | Kilocycles to Crack | |
|---|---|---|
| | Unaged | Aged 7 days/158° F. |
| 4-dimethylamino-4'-isopropylaminodiphenylamine | 24,680 | 18,532 |
| 4-dimethylamino-4'-(1,3-dimethylbutylamino)-diphenylamine | 5,885 | 14,006 |
| 4-dimethylamino-4'-(2-octylamino)-diphenylamine | 9,856 | 12,868 |
| None | 1,528 | 1,360 |

Example 10

The ability of the chemicals of the present invention to inhibit the bulk oxidation of natural rubber was determined. In the following recipe,

| | Parts by weight |
|---|---|
| Smoked sheets | 100.0 |
| Zinc oxide | 5.0 |
| ISAF carbon black | 45.0 |
| Pine tar | 4.5 |
| Stearic acid | 4.5 |
| N-cyclohexyl-2-benzothiazolesulfenamide | 0.5 |
| Sulfur | 2.5 |
| Antioxidant test chemical | 2.0 | the rubber stocks were cured for 60 minutes at 292° F. The retention of tensile strength after aging in oxygen for 96 hours at 70° C. demonstrates the effectiveness of these chemicals as antioxidants. The results are shown in the following table.

| | Tensile Strength | | |
|---|---|---|---|
| | (Lbs./sq. in.) | | Percent Retained |
| | Unaged | Aged | |
| 4-dimethylamino-4'-isopropyl-aminodiphenylamine | 3,620 | 1,880 | 52 |
| 4-dimethylamino-4'-(1,3-dimethylbutylamino)diphenylamine | 3,850 | 1,750 | 45 |
| 4-dimethylamino-4'-(2-octylamino)-diphenylamine | 3,950 | 1,560 | 40 |
| 4-dimethylamino-4'-(cyclohexylamino)-diphenylamine | 3,790 | 1,620 | 43 |
| 4-diethylamino-4'-isopropylamino-diphenylamine | 4,050 | 1,280 | 32 |
| 4-diethylamino-4'-(2-octylamino)-diphenylamine | 4,060 | 1,330 | 33 |
| None | 4,020 | 720 | 18 |

It may be seen from the above table that the chemicals of the present invention are also antioxidants for rubber.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A 4 - dialkylamino-4'-sec.-alkylaminodiphenylamine in which said alkyl radicals have 1 to 8 carbon atoms and said sec.-alkyl radical has 3 to 8 carbon atoms.

References Cited

UNITED STATES PATENTS

| 2,393,889 | 1/1946 | Cook et al. | 260—576 |
| 2,494,059 | 1/1950 | Ruggles | 260—576 |
| 2,756,145 | 7/1956 | Ballard et al. | |
| 3,265,736 | 8/1966 | Wheeler | 260—576 |

OTHER REFERENCES

Wieland, "Berichte," vol. 53, pp. 1317, 1319–20 and 1328 (1920).

CHARLES B. PARKER, *Primary Examiner.*

R. V. HINES, *Assistant Examiner.*